United States Patent [19]

Banks et al.

[11] Patent Number: 5,512,809
[45] Date of Patent: Apr. 30, 1996

[54] APPARATUS AND METHOD FOR STARTING AND CONTROLLING A MOTOR

[75] Inventors: Scott A. Banks, Ivyland; Valery Kravets, Richboro, both of Pa.; John C. Fox, Cherry Hill, N.J.

[73] Assignee: Penn Ventilator Co., Inc., Philadelphia, Pa.

[21] Appl. No.: 289,070

[22] Filed: Aug. 11, 1994

[51] Int. Cl.[6] .................................................. H02P 1/44
[52] U.S. Cl. .......................... 318/778; 318/785; 318/786; 318/789
[58] Field of Search .................................... 318/727, 729, 318/731, 732, 778, 779, 781, 785, 786, 789, 790, 793, 794

[56] References Cited

U.S. PATENT DOCUMENTS

| | | |
|---|---|---|
| 4,052,648 | 10/1977 | Nola . |
| 4,100,466 | 7/1978 | Schroeder . |
| 4,298,834 | 11/1981 | Opfer . |
| 4,422,030 | 12/1983 | McAllise . |
| 4,806,838 | 2/1989 | Weber . |
| 5,139,009 | 8/1992 | Walsh .................................. 126/299 R |

Primary Examiner—Bentsu Ro
Attorney, Agent, or Firm—Panitch Schwarze Jacobs & Nadel

[57] ABSTRACT

An apparatus and method for starting and controlling a motor comprises a timing circuit and a main control circuit. The timing circuit initiates a start-up period upon detecting power and provides an indication of the start-up period. The main control circuit receives the indication of the start-up period and applies variable magnitudes of power to a main winding of the motor. During the start-up period, the power applied to the main winding has a fixed, substantially maximum magnitude. During a period of normal operation following, the power applied to the main winding has a user-adjustable magnitude. The start-up period duration is as long as necessary for the motor to overcome a starting load thereon. Preferably, the timing circuit has a timer measuring the start-up period and a main relay signaling the start-up period to the main control circuit. Preferably, the apparatus also has a start-up relay and a start-up control circuit applying power to a start-up winding of the motor in addition to the power applied by the main control circuit to the main winding during the start-up period.

23 Claims, 3 Drawing Sheets

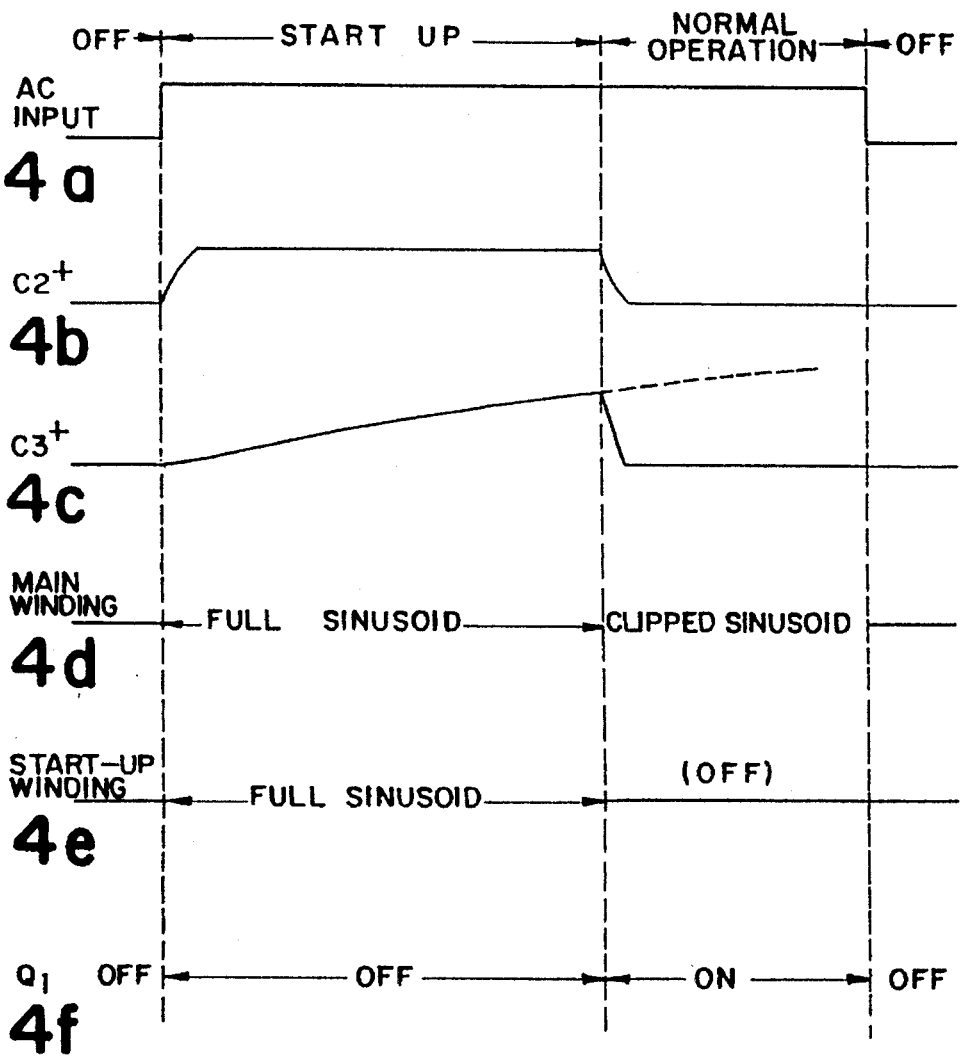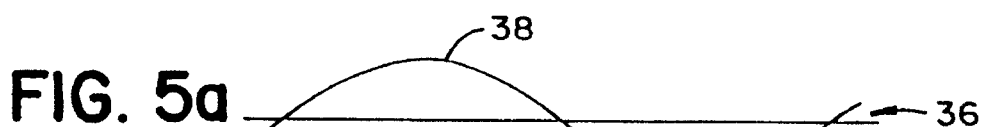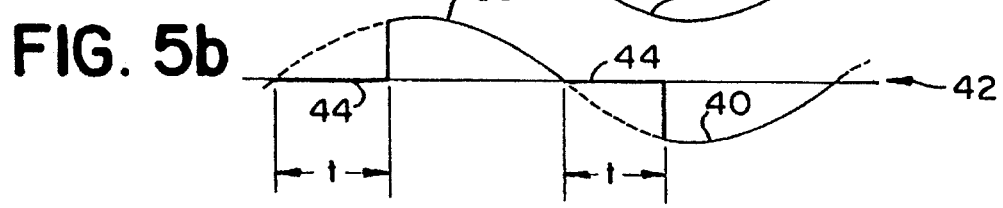

APPARATUS AND METHOD FOR STARTING AND CONTROLLING A MOTOR

FIELD OF THE INVENTION

The present invention relates generally to an apparatus and method for starting a motor and for controlling the motor during a period of normal operation. More particularly, the invention relates to such an apparatus and method used in connection with a motor having a relatively high starting load such as an AC induction motor in a commercial, institutional, or industrial exhaust ventilation system.

BACKGROUND OF THE INVENTION

Cooking processes such as grilling, frying, baking, broiling and other similar processes generate and release into the air substantial amounts of heat and cooking by-products including grease particles, smoke, odors, and the like. In order to comply with local municipal codes as well as to assure health, safety, and cleanliness, the heated air is conventionally removed from a commercial, institutional, or industrial kitchen facility and the building housing such kitchen facility through an exhaust ventilation system.

The exhaust ventilation system typically includes a hood extending over the area in which food is cooked and a motor-driven exhaust fan for drawing air containing the aforementioned heat and cooking by-products to the hood. In turn, the drawn air is impelled by the fan to the exterior of the building.

A conventional exhaust ventilation system draws a considerable quantity of air from the interior of the building while removing the unwanted heat and cooking by-products. As should be understood, such air has likely been heated or cooled by an air conditioning system associated with the building. The removal of such air causes exterior air to be drawn into the building to replace the exhausted air, and the air conditioning system must be operated to heat or cool the drawn exterior air. The operation of the air conditioning system to continually heat or cool air which will be drawn out of the building by the exhaust ventilation system creates a substantial expense of operation through higher utility bills. Accordingly, it is useful to operate an exhaust ventilation system at a slower rate during periods of slower activity to reduce such utility bills.

Typically, a commercial, institutional, or industrial exhaust ventilation system employs one or more single-phase AC induction motors to drive one or more fans either directly or indirectly via a belt and pulley system or the like. As is well known, there are many methods of controlling the speed of an AC induction motor. Frequency inverters are common for three-phase motors but are too costly for small single-phase equipment. Usually, the rotational speed of a single-phase motor is regulated using a controller that turns off the AC voltage applied to the winding of the motor for an adjustable period during each half cycle of alternating current. However, it has been recognized that single-phase motors, including shaded pole and permanent split capacitor motors, typically have limited starting torque. Accordingly, such motors are not able to start themselves when they are connected to high starting loads and the controller is set to apply only a relatively small portion of the AC voltage to the winding of the motor. Moreover, the powered winding of a powered motor that is not rotating can burn out.

Single-phase motors that are designed to overcome the starting torque problem, such as capacitor start motors, have an extra winding that is controlled by a centrifugal switch. The switch operates to apply power to the extra winding during start-up, and then cuts out the extra winding when the motor achieves sufficient running speed. However, a reduction in speed in such a motor causes the switch to close and activate the extra winding, resulting in excessive temperature, speed fluctuation, and possible winding burnout.

Accordingly, it is seen that a need exists for an apparatus and method for starting such a motor, for controlling the motor during a period of normal operation, and for allowing the motor to rotate at a relatively low speed during the period of normal operation while avoiding the problems outlined above.

SUMMARY OF THE INVENTION

Briefly stated, the present invention comprises an apparatus for starting a motor having a starting load and for controlling the motor during a period of normal operation. The apparatus comprises a timing circuit and a control circuit. The timing circuit initiates a start-up period having a predetermined duration upon detecting an initial application of power and has an output for providing an indication of the start-up period. The control circuit has an input coupled to the output of the timing circuit to receive the indication of the start-up period, and applies variable magnitudes of power to the motor. During the start-up period, the power has a fixed, substantially maximum magnitude. During the period of normal operation following the start-up period, the power has a user-adjustable magnitude. The duration of the start-up period is at least as long as necessary for the motor to overcome the starting load thereon.

Preferably, the timing circuit has a timer that includes a resistive-capacitive portion for measuring the start-up period upon the initial application of power and a switch operatively coupled to the control circuit. Preferably, the switch is in a first state during the start-up period and in a second state during the period of normal operation. Preferably, the timing circuit also has a relay coupled to the control circuit for signaling the start-up period.

Preferably, the relay is a main relay, the control circuit is a main control circuit for applying power to a main winding of the motor, and the apparatus also has a start-up relay and a start-up control circuit for applying power to a start-up winding of the motor during the start-up period. Thus, the power applied to the start-up winding during the start-up period is in addition to the power applied to the main winding during the start-up period to overcome the starting load on the motor.

The present invention also comprises a method for starting a motor having a starting load which includes the steps of initiating a start-up period having a predetermined duration upon detecting an initial application of power to the motor, applying a fixed, substantially maximum magnitude of power to the main winding of the motor during the start-up period, applying a fixed, substantially maximum magnitude of power to the start-up winding of the motor during the start-up period, applying at least one of a plurality of variable magnitudes of power to the main winding of the motor during the period of normal operation, and applying substantially no power to the start-up winding of the motor during the period of normal operation.

BRIEF DESCRIPTION OF THE DRAWINGS

The foregoing summary, as well as the following detailed description of preferred embodiments of the invention, will be better understood when read in conjunction with the appended drawings. For the purpose of illustrating the invention, there is shown in the drawings an embodiment which is presently preferred. It should be understood, however, that the invention is not limited to the precise arrangements and instrumentalities shown. In the drawings:

FIGS. 4a–4f show timing diagrams of certain operational features of the circuitry of FIG. 3; and FIGS. 5a and 5b show a full sinusoid waveform and a clipped sinusoid waveform, respectively.

DETAILED DESCRIPTION OF PREFERRED EMBODIMENTS

Figure 1:
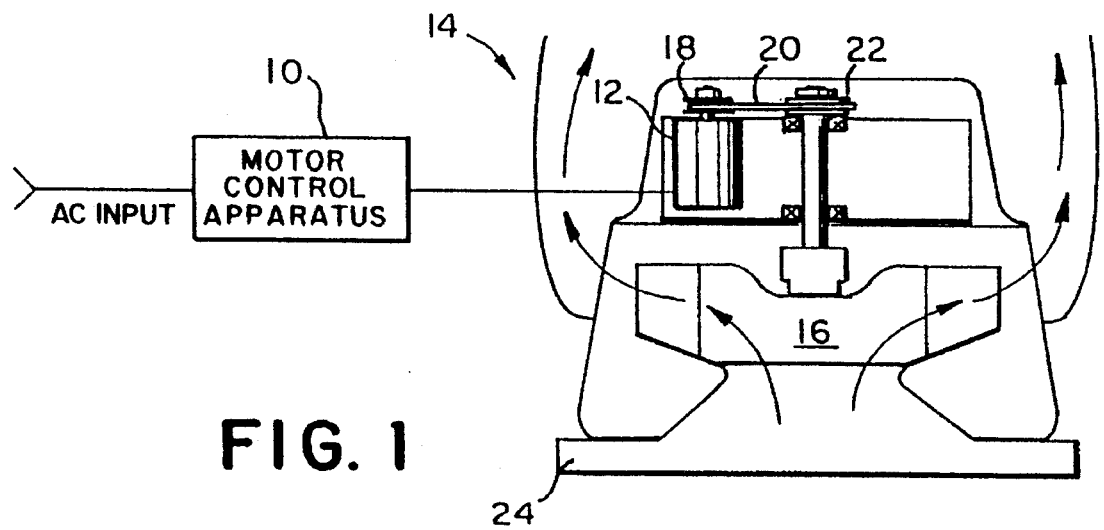
FIG. 1 is a schematic block diagram of a motor control apparatus in accordance with the present invention interconnected with an AC induction motor linked to an exhaust fan in an exhaust hood.

Certain terminology may be used in the following description for convenience only and is not limiting. The words "left", "right", "upper" and "lower" designate directions in the drawings to which reference is made. The words "inwardly" and "outwardly" are further directions toward and away from, respectively, the geometric center of a referenced element. The terminology includes the words above specifically mentioned, derivatives thereof, and words of similar import.

Referring to the drawings in detail, wherein like numerals are used to indicate like elements throughout, there is shown in FIG. 1 a motor control apparatus 10 constructed in accordance with a preferred embodiment of the present invention and controlling a motor 12 in an exhaust system 14. As seen, the motor 12 in the exhaust system 14 drives a fan or impeller 16 indirectly via a pulley 18 attached to the drive shaft of the motor 12 and a pulley 22 attached to the drive shaft of the fan 16, where the pulleys 18, 22 are interconnected by a belt 20. Accordingly, the fan 16 is caused to rotate by the motor 12 such that air is drawn up into a hood 24, through the exhaust system 14, and out via appropriate ducting (not shown) and/or an outside exhaust port (also not shown).

As one skilled in the art will recognize, the motor control apparatus 10 may be employed with any of several different types or styles of exhaust systems 14 and is not limited to the particular exhaust system 14 depicted in FIG. 1. For example, the exhaust system 14 may comprise a motor directly driving a single fan (not shown), a motor indirectly driving a plurality of fans (not shown), a plurality of motors directly or indirectly driving a plurality of fans (not shown), or the like. Further, the motor control apparatus 10 may be employed to operate the motor 12 in any of a plurality of applications including but not limited to residential, commercial, and industrial machinery or the like. For example, the motor control apparatus 10 may be employed to operate a motor 12 driving a variable-speed conveyor belt, a weaving machine, a water pump, or any of a plurality of other devices. Preferably, the motor 12 is a single phase AC induction motor. However, one skilled in the art will recognize that other types of motors may be controlled via the motor control apparatus 10.

Figure 2:
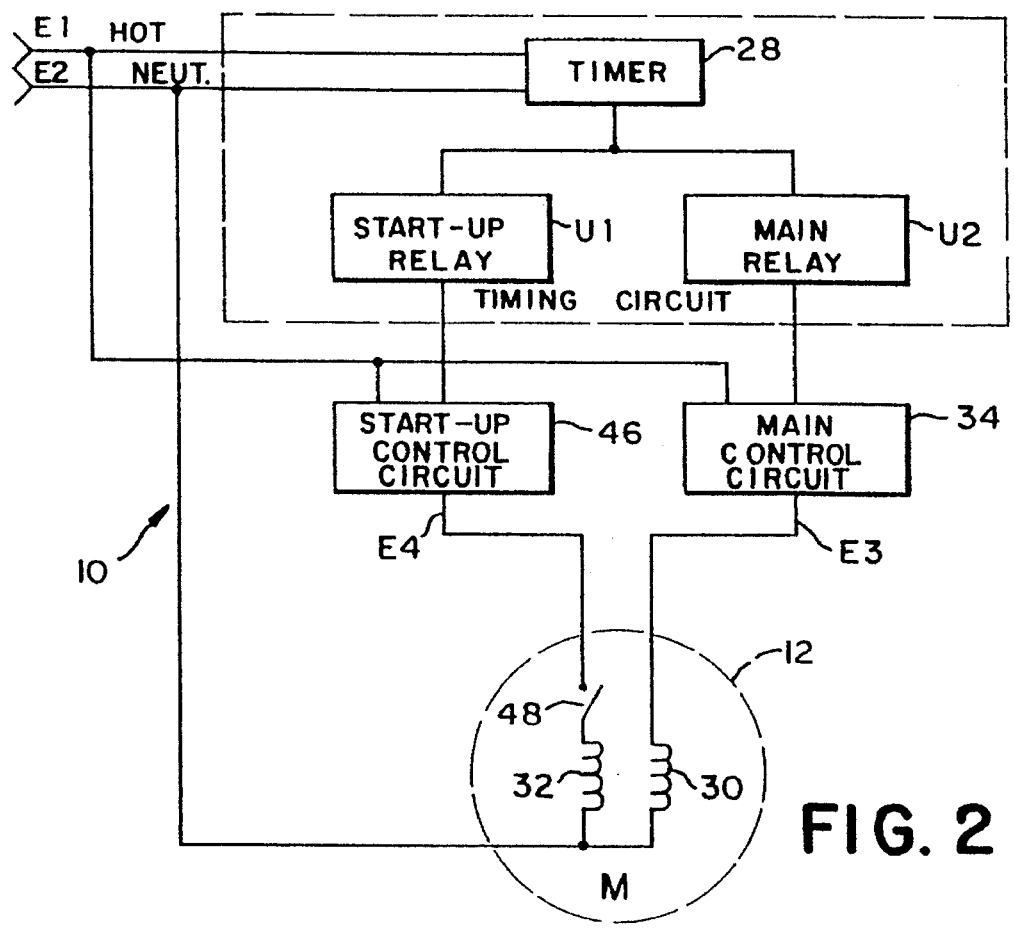
FIG. 2 is a more detailed block diagram of the motor control apparatus and the motor of FIG. 1.
Figure 3:
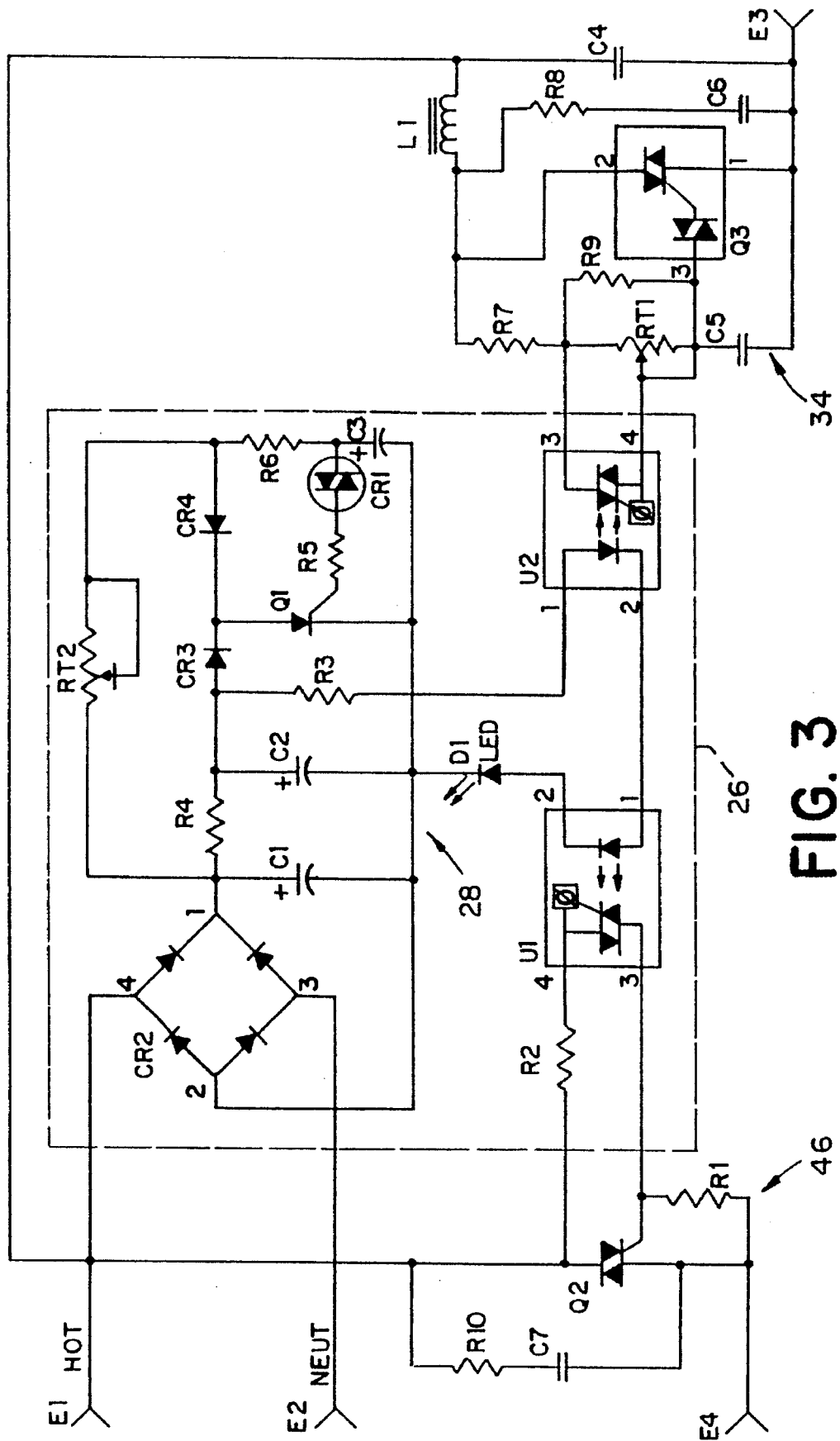
FIG. 3 is a more detailed schematic diagram of the circuitry of the motor control apparatus of FIG. 1.

Referring now to FIGS. 2 and 3, a preferred embodiment of the motor control apparatus 10 will now be described. As may be readily understood, electrical power is supplied to the apparatus 10 and the motor 12 via an AC power source or supply (not shown) having a hot line E1 and a neutral line E2. The AC power supply may provide 120 volts AC or any other suitable or necessary voltage as may be required. Upon an initial application of power from the AC power supply, a timing circuit 26 receives the voltage from the power supply and initiates a start-up period having a predetermined duration. Typically, a user-controlled or automatic switch (not shown) is interposed between the AC power supply and the motor control apparatus 10, and a user or controller of the exhaust system 14 activates the switch to cause the application of power.

The timing circuit 26 includes a timer 28 for measuring the duration of a motor start-up period. The timer 28 includes a rectifier CR2 having an input for receiving the voltage from the AC power supply and an output for providing a substantially DC voltage. Preferably, the rectifier CR2 is a well-known full wave bridge-type rectifier comprising four diodes. However, one skilled in the art will recognize that other rectifiers may be employed without departing from the spirit and scope of the present invention. Also preferably, a capacitor C1 is placed across the output of the rectifier CR2 to maintain the substantially DC voltage output.

In the timer 28, a variable resistor RT2, a resistor R6, and a capacitor C3 are interconnected to form a resistive-capacitive portion positioned across or generally parallel to capacitor C1. Preferably, the interconnection is a serial connection with the variable resistor RT2 contacting the more positive side of the capacitor C1 and the capacitor C3 contacting the less positive side of the capacitor C1. Thus, the DC voltage of the capacitor C1 charges capacitor C3 through resistors RT2 and R6 according to an RC time constant upon the initial application of power. As should be recognized, the aforementioned RC time constant is determined based upon resistors RT2 and R6 and the capacitor C3.

As seen in FIG. 3, the positive side of capacitor C3 is connected to resistor R6 and a diac CR1. The diac CR1 may be a diac manufactured by Tecor as part number HT-32. As will be recognized, diac CR1 is a semiconductor device that does not conduct current therethrough unless the voltage across the device reaches a predetermined break-over voltage. Once the diac has achieved the break-over voltage, the device is conductive until the current flowing through the device falls below a minimum value at which time the device stops conducting current. Accordingly, once the capacitor C3 charges to the predetermined break-over voltage for the diac CR1, the diac CR1 becomes conductive and provides current through resistor R5 to the gate of a silicon controlled rectifier (SCR) Q1. The SCR Q1 may be an SCR manufactured by Tecor as part number TCR22-6. As seen in FIG. 3, the SCR Q1 is connected across a capacitor C2 with a diode CR3, and the capacitor C2 is connected across the capacitor C1 with a resistor R4.

The diac CR1 and the SCR Q1 act as a switch in the timer 28 to signal the start-up period to the motor control apparatus 10. Specifically, and as seen in FIGS. 4a, 4b, and 4f, when power is initially applied and the DC voltage appears across the capacitor C1, the SCR Q1 is non-conductive and capacitor C2 charges relatively quickly through resistor R4 to a first voltage substantially equal to the voltage across the capacitor C1. The capacitor C2 remains at the first voltage until the voltage across the capacitor C3 increases (at a much slower rate) to the point where diac CR1 breaks over and the SCR Q1 is turned on, at which time capacitor C2 is essentially shorted out and the voltage across the capacitor C2 discharges through SCR Q1 to a second substantially zero voltage.

Thus, the SCR Q1 is non-conductive when the voltage across the capacitor C3 is in a first predetermined range below the diac CR1 break-over voltage and conductive when the voltage across the capacitor C3 crosses to a second predetermined range above the break-over voltage. However, one skilled in the art will recognize that the timer 28 may be arranged so that the SCR Q1 is conductive during the first predetermined range and non-conductive when the crossing to the second predetermined range occurs.

Preferably, the variable resistor RT2 is employed to allow a technician or a user to adjust the RC time constant of the resistive-capacitive portion of the timer 28. As should be recognized, the adjustment of the RC time constant correspondingly adjusts the duration of the start-up period. However, one skilled in the art will recognize that the variable resistor RT2 may also be fixed to provide a set duration for the start-up period.

When the SCR Q1 is non-conductive and the capacitor C2 is at the first voltage during the start-up period, current flows through a resistor R3 and a relay U2 positioned across the capacitor C2. Preferably, the relay U2 is an opto-isolator triac type having a light-emitting diode and a light-receiving triac device. Thus, the current received by the relay flows through the light-emitting diode such that light is emitted during the start-up period, and the light-detecting triac detects the emitted light and becomes conductive. As one skilled in the art will recognize, the triac remains conductive until the device ceases to detect emitted light from the light-emitting diode and current through the device drops below a predetermined minimum value.

Preferably, the relay U2 is a main relay for controlling a main winding 30 of the motor 12, and a second relay U1 is employed to control a start-up winding 32 of the motor 12. The relays U1 and U2 may be opto-isolators manufactured by Motorola as part number MOC3041. Preferably, the relays U1 and U2 are substantially identical and the light-emitting diodes of the relays U1 and U2 are connected in series with resistor R3 across the capacitor C2.

As one skilled in the art will recognize, the relays U1 and U2 are not limited to the opto-isolators described. Instead, the relays U1 and U2 may be any of several different kinds of relays including mechanical relays, electrical relays, optical relays, and/or the like. Similarly, one skilled in the art will recognize that the relays U1 and U2 may be operated to be non-conductive when receiving a signal representative of the start-up period.

As seen in FIG. 3, a separate light-emitting diode (LED) D1 may be placed in series with resistor R3 and the light-emitting diodes of relays U1 and U2. Thus, the LED D1 is employed as a visual indicator of the start-up period to a user of the motor control apparatus 10 and the exhaust system 14.

As should now be recognized, the start-up period ends when the SCR Q1 becomes conductive. Accordingly, the capacitor C3 discharges through the SCR Q1 via resistor R6 and a diode CR4. Note that enough current must be supplied through the SCR Q1 from the capacitor C1 via resistor R4 and a diode CR3, and via resistor RT2 and the diode CR4, such that SCR Q1 does not become non-conductive to falsely indicate a new start-up period. Note, also, that once the power supplied to the motor control apparatus 10 and the exhaust system 14 has been turned off, the power must remain off for a predetermined period of time to allow the current through the diac CR1 to drop below the minimum value and cause the diac CR1 to become non-conductive. Otherwise, a new application of power will not cause a new start-up period since the SCR Q1 continues to be conductive.

As seen in FIGS. 2 and 3, the motor control apparatus 10 has a main control circuit 34 coupled across the triac of relay U2. The relay U2 signals the start-up period to the main control circuit 34. The main control circuit 34 receives an AC voltage waveform (as seen in FIG. 5a) from the AC power supply and provides at least a portion of the waveform (as seen in FIG. 5b) to the main winding 30. As seen in FIG. 5a, a typical full sinusoid waveform 36 provided from the AC power supply has a positive-going half sine wave 38 and a negative-going half sine wave 40. The main control circuit 34 controls the power delivered the main winding 30 of the motor 12 by removing portions of each half sine wave 38, 40 to produce the clipped sinusoid 42 shown in FIG. 5b. The clipped or removed portions of the clipped sinusoid 42 are represented by the element number 44.

Preferably, the main control circuit 34 has a resistive-capacitive portion including a resistor R7, a resistor R9, a variable resistor RT1, and a capacitor C5. Preferably, the triac of the relay U2 and resistors RT1 and R9 are connected in parallel, the parallel combination is connected in series with capacitor C5 and resistor R7, resistor R7 contacts the hot line from the AC power source via an inductor L1, and capacitor C7 contacts a terminal E3 leading to the main winding 30 of the motor 12. However, one skilled in the art will recognize that the resistive-capacitive portion may employ other arrangements and that the above-described arrangement is not limiting.

The resistive-capacitive portion of the main control circuit 34 has an RC time constant according to the values of the aforementioned resistors and capacitors and the conductive or non-conductive state of the triac of relay U2. Thus, capacitor C5 is charged by the AC voltage source through resistors R7, R9, and RT1 during each half sine wave according to the RC time constant.

As seen in FIG. 3, the resistive-capacitive portion is coupled to a triac-diac combination Q3 to form a clipper portion in the main control circuit 34. The device Q3 may be a triac-diac combination manufactured by Tecor as part number Q4015LT. Specifically, the triac portion of Q3 is interposed between the hot line from the AC power source via inductor L1 and the terminal E3, and the diac portion of Q3 is interposed between the gate for the triac and capacitor C5.

In operation, the diac and the triac of device Q3 are non-conductive at the beginning of each half sine wave 38, 40 from the AC voltage source. Each half sine wave 38, 40 charges the capacitor C5 according to the RC time constant until the voltage across the capacitor C5 reaches the break-over voltage for the diac. Once the Q3 diac becomes conductive, the Q3 triac also becomes conductive and the voltage waveform from the AC voltage source appears at terminal E3 and at the main winding 30 of the motor 12. As should be recognized, the Q3 triac and diac stay conductive until the end of a half sine wave and then become non-conductive for the next half sine wave until the Q3 diac again breaks over.

Accordingly, the portion of the voltage waveform from the AC voltage source that is not clipped appears at terminal E3. As will now be recognized, the RC time constant of the resistive-capacitive portion of the main control circuit 34 determines the amount of time t (as seen in FIG. 5b) that each half sine wave 38 or 40 is clipped.

During the start-up period, the triac in relay U2 is conductive, the resistors R9 and RT1 are essentially shorted out, and the RC time constant of the resistive-capacitive portion of the main control circuit 34 is at a minimum. As a result, the capacitor C5 charges at a high rate, the time period t is short, and a relatively small portion of each half sine wave is clipped. Accordingly, the magnitude of the power applied to the main winding 30 of the motor 12 is at a fixed, substantially maximum magnitude and a maximum torque is applied to overcome the starting load on the motor 12. Preferably, the duration of the start-up period is at least as long as is necessary for the motor 12 to overcome the starting load.

During the period of normal operation after the start-up period, the triac in the relay U2 is non-conductive and the RC time constant of the resistive-capacitive portion of the main control circuit 34 is determined by resistors R7, R9, and RT1 and capacitor C5 to be a value larger than the aforementioned minimum. As a result, the capacitor C5 charges at a slower rate, the time period [t] is longer, and a relatively larger portion of each half sine wave is clipped. Accordingly, an adjustable magnitude of power is applied to the main winding 30 of the motor 12.

In employing the motor control apparatus 10 controlling the motor 12 in the exhaust system 14, a user may decide that the motor 12 should be operated at a relatively slow speed since a relatively small amount of grilling, frying, and/or the like is being performed. As should be recognized, the slow speed draws less air and therefore reduces the overall energy consumed to heat and cool the building housing the exhaust system 12. Thus, the user may adjust variable resistor RT1 of the motor control apparatus 10 accordingly. Preferably, the motor control apparatus 10 and the exhaust system 14 are provided with an adjusting means to facilitate the adjustment of variable resistor RT1. The adjusting means may comprise a slide or a rotating knob in communication with the variable resistor RT1, although one skilled in the art will recognize that other adjusting means and other variable elements may be employed without departing from the spirit and scope of the present invention.

Preferably, the fixed substantially maximum magnitude of power applied by the main control circuit 34 to the motor 12 during the start-up period is at least slightly greater than the maximum of the adjustable magnitude of power provided during the period of normal operation. Preferably, the main control circuit 34 includes a capacitor C4 interposed between the hot line from the AC voltage source and terminal E3 which, with inductor L1, suppresses radio frequency interference emissions from the circuit. Preferably, the main control circuit 34 also includes a resistor R8 and a capacitor C6 positioned in series across the triac as a snubber.

When the motor 12 has a start-up winding 32, it is preferable that the motor control apparatus 10 also include a start-up control circuit 46 for providing power to the start-up winding 32. As should be evident, the start-up control circuit 46 is coupled across the start-up relay U1 to receive the signal indicative of the start-up period. Preferably, the start-up control circuit 46 has a triac Q2 interposed between the hot line from the AC voltage source and a terminal E4 leading to the start-up winding 32, and the triac of the start-up relay U1 connects from the hot line via a resistor R2 to the gate of triac Q2. The triac Q2 may be a triac manufactured by Tecor as part number Q4025R6.

Thus, when the triac of the start-up relay U1 is conductive during the start-up period, the triac Q2 is conductive and allows the full AC voltage waveform from the power supply to be supplied to the start-up winding 32 through the terminal E4. Once the start-up period ends and the triac in the start-up relay U1 becomes non-conductive, the triac Q2 becomes non-conductive once the current therethrough falls below a predetermined minimum value. Thus, the start-up control circuit 46 provides substantially no power to the start-up winding 32 of the motor 12 during the period of normal operation. Preferably, a resistor R1 is provided between the gate of the triac Q2 and the terminal E4 to prevent the triac Q2 from inadvertently turning on after the start-up period has ended. Also preferably, a snubber comprising a resistor R10 and a capacitor C7 is placed across the triac Q2.

As will be recognized, the power applied to the start-up winding 32 by the start-up control circuit 46 during the start-up period is in addition to the power applied by the main control circuit 34 to the main winding 30 of the motor 12 during the start-up period. The additional power provided to the start-up winding 32 of the motor 12 provides additional torque to help overcome the starting load on the motor 12.

As will also be recognized, a motor 12 having a centrifugal switch 48 connected in series with the start-up winding 32 may be employed in connection with the motor control apparatus 10 having the start-up control circuit 46 as described. Although the centrifugal switch 48 may become conductive when the speed of the motor 12 is reduced below a certain value during the period of normal operation, the start-up winding 32 is not energized since no power is provided by the start-up control circuit 46 during the period of normal operation.

The operation of the motor control apparatus 10 will now be described with reference to FIGS. 4A through 4F. FIG. 4A represents the presence or absence of power at the AC input to the motor control apparatus 10, according a user- or controller-actuated switch. FIGS. 4B and 4C represent the voltages across the capacitors C2 and C3, respectively. FIGS. 4D and 4E represent the waveforms delivered to the main and start-up windings 30, 32, respectively. A full sinusoid and a clipped sinusoid are waveforms substantially as shown in FIGS. 5A and 5B, respectively. FIG. 4F represents the conductive state of the SCR Q1 in the timer 28.

As seen in FIGS. 4A through 4F, at a time just prior to the application of power from the AC voltage source via the user-actuated switch (not shown), the voltages across capacitor C2 and C3 are substantially zero, no power is applied to the main and start-up windings 30, 32, and the SCR Q1 is non-conductive. Once power is applied from the AC voltage source via the user-actuated or automatically actuated switch, the voltage across the capacitor C2 rises to a predetermined level relatively quickly, thus providing an indication of the onset of the start-up period and activating the relays U1 and U2 as described above. Accordingly, substantially full sinusoid waveforms are applied to both the main and start-up windings 30, 32, by the main and start-up control circuits 34, 46, respectively. At the same time during the start-up period, capacitor C3 charges at a relatively slow rate according to the aforementioned RC time constant of the timer 28. During the start-up period, the SCR Q1 remains non-conductive.

Once the voltage across charging capacitor C3 reaches the break-over voltage of diac CR1, SCR Q1 becomes conductive as described above. As a result, current quickly ceases to flow to relays U1 and U2 and capacitor C3 discharges at a relatively fast rate. Since the light-emitting devices in relays U1 and U2 are no longer emitting, the triacs become non-conductive once the respective currents passing therethrough drop below the predetermined minimum level. As a result, the start-up control circuit 46 turns off and power is no longer supplied to the start-up winding 32. However, power continues to be supplied to the main winding 30 by the main control circuit 34, but in the form of a clipped sinusoid according to the RC time constant set in part by variable resistor RT1 for the main control circuit 34.

Once power to the motor control apparatus 10 and motor 12 are turned off, the main control circuit 34 ceases to provide power to the main winding 30 of the motor 12 and the SCR Q1 again becomes non-conductive. The power must remain off for a predetermined period of time (approximately one to two seconds being preferred) to allow the diac CR1 to turn off in order to allow the initiation of a new start-up period when power is re-applied.

As one skilled in the art will recognize, the above-described motor control apparatus 10 may be used to control a motor 12 that lacks a start-up winding 32. In such a case, terminal E4 from the start-up control circuit would not be attached to the motor 12 and all power would be supplied through the main control circuit 34. Alternately, the start-up relay U1 and the start-up control circuit 46 may be removed from the apparatus 10 entirely.

It will be appreciated by those skilled in the art that changes could be made to the embodiments described above without departing from the broad inventive concepts thereof. It is understood, therefore, that this invention is not limited to the particular embodiments disclosed, but it is intended to cover modifications within the spirit and scope of the present invention as defined by the appended claims.

We claim:

1. An apparatus for starting a motor having a starting load and for controlling the motor during a period of normal operation, the apparatus comprising:

a timing circuit for initiating a start-up period having a predetermined duration upon detecting an initial application of power, the timing circuit having an output for providing an indication of the start-up period;

a main control circuit having an input coupled to the output of the timing circuit for receiving the indication of the start-up period, the control circuit for applying variable magnitudes of power to a main winding of the motor, the power having a fixed, substantially maximum magnitude during the start-up period and an adjustable magnitude during the period of normal operation, the period of normal operation generally following the start-up period, the duration of the start-up period being at least as long as necessary for the motor to overcome the starting load thereon: and a start-up control circuit having an input coupled to the output of the timing circuit for receiving the indication of the start-up period, the start-up control circuit for applying power to a start-up winding of the motor during the start-up period, the power applied to the start-up winding during the start-up period being in addition to the power applied to the main winding during the start-up period to overcome the starting load on the motor.

2. The apparatus of claim 1 wherein the adjustable magnitude of the power during normal operation of the motor is less than the fixed, substantially maximum magnitude of the power applied to the motor during the start-up period.

3. The apparatus of claim 1 wherein the timing circuit comprises a timer for measuring the duration of the start-up period, the timer having an input for receiving an indication of the initial application of power and an output for providing a predetermined signal during the start-up period.

4. The apparatus of claim 3 wherein the timer comprises:

a resistive-capacitive portion having a resistor and a capacitor, the resistive-capacitive portion also having an RC time constant, the capacitor for being charged through the resistor according to the RC time constant upon the initial application of power, the resistive-capacitive portion also having an output coupled to the resistor and the capacitor, the output having a voltage representative of the charge on the capacitor; and a switching portion having an input coupled to the output of the resistive-capacitive portion for receiving the voltage representative of the charge on the capacitor, and a switch operatively coupled to the control circuit, the switch being in one of an open state and a closed state when the received voltage is in a first predetermined range and being in the other of the open state and the closed state when the received voltage crosses to a second predetermined range.

5. The apparatus of claim 4 wherein the resistor includes a user-adjustable variable resistor for adjusting the RC time constant, the duration of the start-up period corresponding to the RC time constant.

6. The apparatus of claim 4 wherein the switch is in the open state when the received voltage is in a first lower range and is in the closed state when the received voltage crosses to a second higher range, the open state being indicative of the start-up period.

7. The apparatus of claim 3 wherein the timing circuit further comprises a relay coupled to the control circuit for signaling the start-up period, the relay having an input coupled to the output of the timer for receiving the predetermined signal during the start-up period, the relay being in one of an open state and a closed state when the input of the relay is receiving the predetermined signal and being in the other of the open state and the closed state when the input of the relay is not receiving the predetermined signal.

8. The apparatus of claim 7 wherein the relay comprises a light emitter having an input coupled to the output of the timer for receiving the predetermined signal, the light emitter for emitting light during the start-up period, and a light-detecting switch coupled to the control circuit, the light-detecting switch for signaling the start-up period to the control circuit upon detecting the light emitted by the light emitter.

9. The apparatus of claim 7 wherein the relay is a main relay and the control circuit is a main control circuit for applying power to a main winding of the motor, the apparatus further comprising:

a start-up relay having an input coupled to the output of the timer for receiving the predetermined signal during the start-up period, and an output for providing an indication of the start-up period, the start-up relay being in one of an open state and a closed state when the input of the timer is receiving the predetermined signal and being in the other of the open state and the closed state when the input of the timer is not receiving the predetermined signal; and a start-up control circuit having an input coupled to the output of the start-up relay for receiving the indication of the start-up period, the start-up control circuit for applying power to a start-up winding of the motor during the start-up period, the power applied to the start-up winding during the start-up period being in addition to the power applied to the main winding during the start-up period to overcome the starting load on the motor.

10. The apparatus of claim 3 wherein the timer further comprises a rectifier having an input for receiving an AC voltage and an output for providing a DC voltage.

11. The apparatus of claim 1 wherein the control circuit comprises a clipping portion interposed between an AC voltage source and the motor, the AC voltage source for providing an AC voltage having positive-going and negative-going half sine waves, the clipping portion for clipping a portion of each half sine wave and for applying the clipped half sine waves to a winding of the motor.

12. The apparatus of claim 11 wherein the clipping portion comprises a resistive-capacitive portion having a resistor and a capacitor, the resistive-capacitive portion also having an RC time constant, the capacitor for being charged by the AC voltage through the resistor during each half sine wave according to the RC time constant, the resistive-capacitive portion also having an output coupled to the resistor and the capacitor, the output having a voltage representative of the charge on the capacitor, each half sine wave being clipped until the voltage of the output reaches a predetermined level.

13. The apparatus of claim 12 wherein the indication of the start-up period from the output of the timing circuit shorts out the resistor.

14. The apparatus of claim 12 wherein the resistor is a user-adjustable variable resistor for adjusting the magnitude of the power applied to the motor during the period of normal operation.

15. The apparatus of claim 1 further comprising the motor, the motor being an AC induction motor.

16. A process for starting a motor having a starting load and for controlling the motor during a period of normal operation, the process comprising the steps of:

initiating a start-up period having a predetermined duration upon detecting an initial application of power to the motor;

providing for variable magnitudes of power to be selectively applied to the motor;

applying a fixed, substantially maximum magnitude of power to a main winding of the motor during the start-up period;

applying a fixed, substantially maximum magnitude of power to a start-up winding of the motor during the start-up period;

applying at least one of the variable magnitudes of power to the main winding of the motor during the period of normal operation, the period of normal operation generally following the start-up period, the duration of the start-up period being at least as long as necessary for the motor to overcome the starting load thereon;

applying substantially no power to the start-up winding of the motor during the period of normal operation; and measuring the duration Of the start-up period with a resistive-capacitive circuit and a switching circuit, the resistive-capacitive circuit having a resistor and a capacitor, the resistive-capacitive circuit also having an RC time constant, the switching circuit coupled to the resistive-capacitive circuit and having an open state and a closed state, the measuring step comprising the steps of:

charging the capacitor through the resistor according to the RC time constant upon the initial application of power; and shifting the switching circuit from one of the open state and the closed state to the other of the open state and the closed state when the charge on the capacitor crosses from a first predetermined range to a second predetermined range.

17. The process of claim 16 wherein the third applying step comprises applying at least one of the variable magnitudes of power to the motor during the period of normal operation, the variable magnitudes of power being less than the fixed, substantially maximum magnitude of power.

18. The process of claim 16 further comprising the step of adjusting the RC time constant to set the duration of the start-up period.

19. The process of claim 16 wherein the shifting step comprises shifting the switching circuit from the open state to the closed state when the charge on the capacitor crosses from a first lower range to a second higher range, the open state being indicative of the start-up period.

20. The process of claim 16 wherein the third applying step comprises:

providing an AC voltage having positive-going and negative-going half sine waves;

clipping a portion of each half sine wave; and applying the clipped half sine waves to the motor.

21. The process of claim 20 wherein the clipping step comprises:

providing a resistive-capacitive circuit having a resistor and a capacitor, the resistive-capacitive circuit also having an RC time constant;

charging the capacitor through the resistor according to the RC time constant during each half sine wave;

clipping each half sine wave until the charge on the capacitor reaches a predetermined level.

22. The process of claim 21 wherein the first applying step further comprises the step of shorting out the resistor during the start-up period.

23. The process of claim 21 further comprising the step of adjusting the RC time constant to adjust the magnitude of the power applied to the motor during the period of normal operation.

* * * * *